United States Patent [19]

Trayner et al.

[11] Patent Number: 5,600,454
[45] Date of Patent: Feb. 4, 1997

[54] VIEWING APPARATUS

[75] Inventors: David J. Trayner; Edwina M. Orr, both of Richmond, England

[73] Assignee: Richmond Holographic Research and Development Ltd, Richmond Upon Thames, England

[21] Appl. No.: 182,136
[22] PCT Filed: Jul. 15, 1992
[86] PCT No.: PCT/GB92/01295
   § 371 Date: Jan. 14, 1994
   § 102(e) Date: Jan. 14, 1994
[87] PCT Pub. No.: WO93/02372
   PCT Pub. Date: Feb. 4, 1993

[30]   Foreign Application Priority Data

Jul. 16, 1991 [GB] United Kingdom ............ 9115394

[51] Int. Cl.⁶ .................. G02B 5/32; G02B 27/22; G03B 35/16
[52] U.S. Cl. .................. 359/15; 359/28; 359/462
[58] Field of Search ................. 359/9, 15, 28, 359/69, 1, 10, 11, 32

[56]      References Cited

U.S. PATENT DOCUMENTS 3,674,331  7/1972  Caulfield ................. 359/28
5,011,244  4/1991  Smith et al. ............. 359/15

*Primary Examiner*—Paul M. Dzierzynski
*Assistant Examiner*—Audrey Chang
*Attorney, Agent, or Firm*—Michael B. McMurry

[57]       ABSTRACT

Viewing apparatus for providing a viewer with an apparent 3-D image includes a diffusing holographic optical element screen, horizontal strip lamps for illuminating the screen from a plurality of different positions and a liquid crystal display for effecting spatial modulation of the light from the respective positions so as to illuminate respective images on the screen. The arrangement is such as to provide a plurality of viewing zones whereby each image can be seen only from a corresponding one of the zones.

4 Claims, 4 Drawing Sheets

VIEWING APPARATUS

FIELD OF THE INVENTION

This invention relates to viewing apparatus particularly, but not exclusively, for providing a viewer with an apparent 3-D image.

BACKGROUND OF THE INVENTION

Stereoscopic apparatus exists in which a pair of nearly identical images are viewed through a binocular optical system to provide the viewer with a perception of a single 3-D image. A disadvantage of such apparatus is the necessity of having to provide such an optical system, usually in the form of a pair of goggles, for use by the viewer.

In effect, such a system provides for viewing a plurality of sets of juxtaposed information and it would be a considerable advantage if this could be achieved without the necessity for the viewer to have to be provided with a pair of goggles.

SUMMARY OF THE INVENTION

According to the present invention, there is provided viewing apparatus comprising a holographic recording (15) of a diffusely illuminated zone (5,9) and means (17, 19) for illuminating the holographic recording (15) from a plurality of different positions such that images (18,20) of the zone (5,9) are reconstructed forming viewing zones (18,20) characterised in that there is provided adjacent the holographic recording (15) a non-projected masking means 14 for effecting spatial modulation of light from the respective positions, the arrangement being such as to provide a plurality of viewing zones (18,20) whereby the said spatial modulation can be seen from a corresponding one of the zones (18,20).

Following is a description, by way of example only and with reference to the accompanying drawings, of one method of carrying the invention into effect.

DETAILED DESCRIPTION OF THE INVENTION

Figure 1:
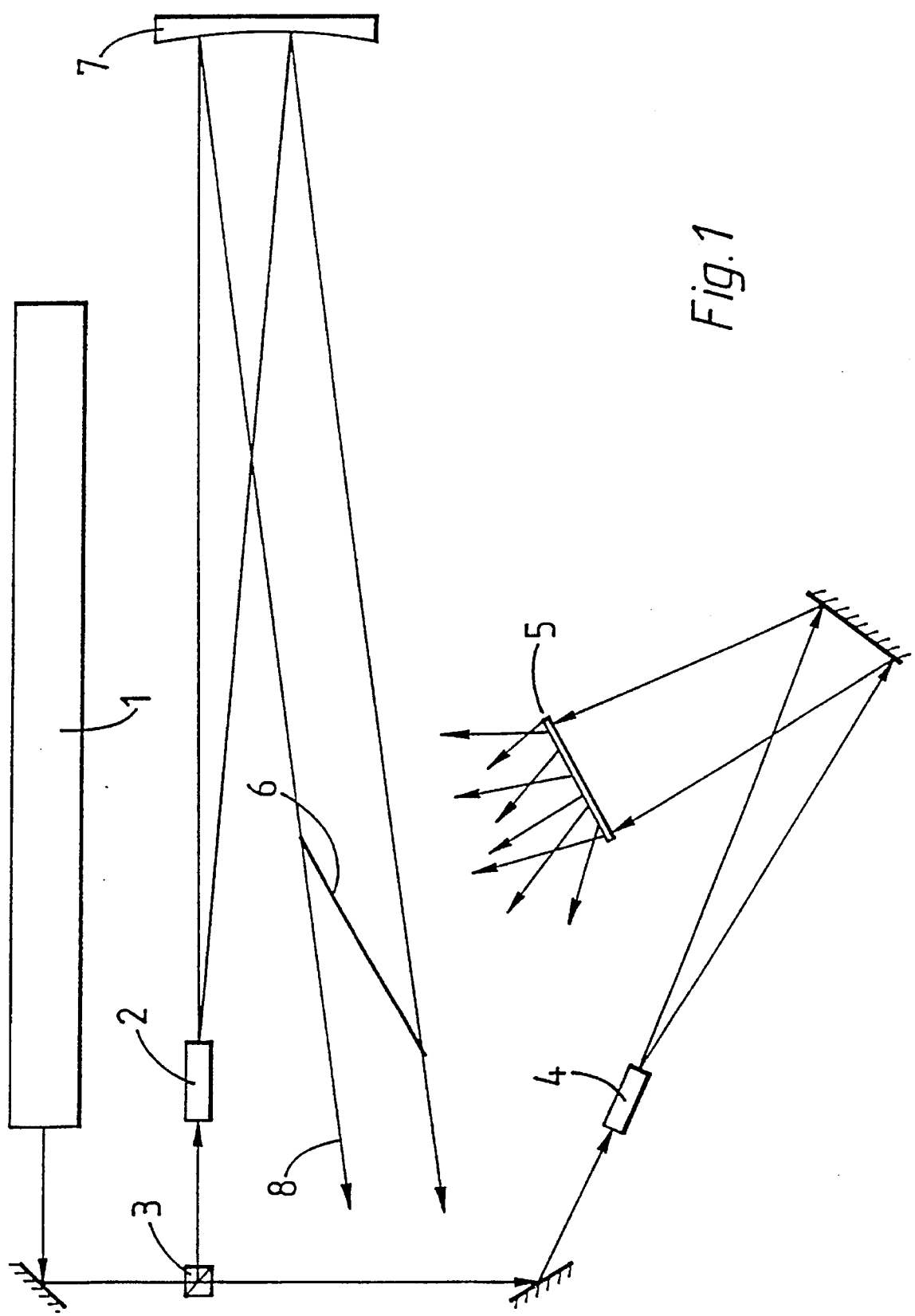
FIG. 1 is a diagrammatic representation of one method of recording a diffusing holographic optical element (HOE) for apparatus in accordance with the present invention.

Referring now to FIG. 1 of the drawings, there is shown apparatus for providing a master hologram from which many HOEs can be formed. A beam from a laser 1 is split by a beam splitter 3 into two beams. One of the beams, a reference beam is expanded by a beam expander 2 and reflected at a concave mirror 7 as a parallel (collimated) beam 8 which impinges on a holographic plate 6. The other of the beams is expanded by a beam expander 4 and is directed towards a diffuser 5 which scatters the light towards the holographic plate 6 where it interferes with the reference beam and a hologram of the diffuser is recorded.

Figure 2:
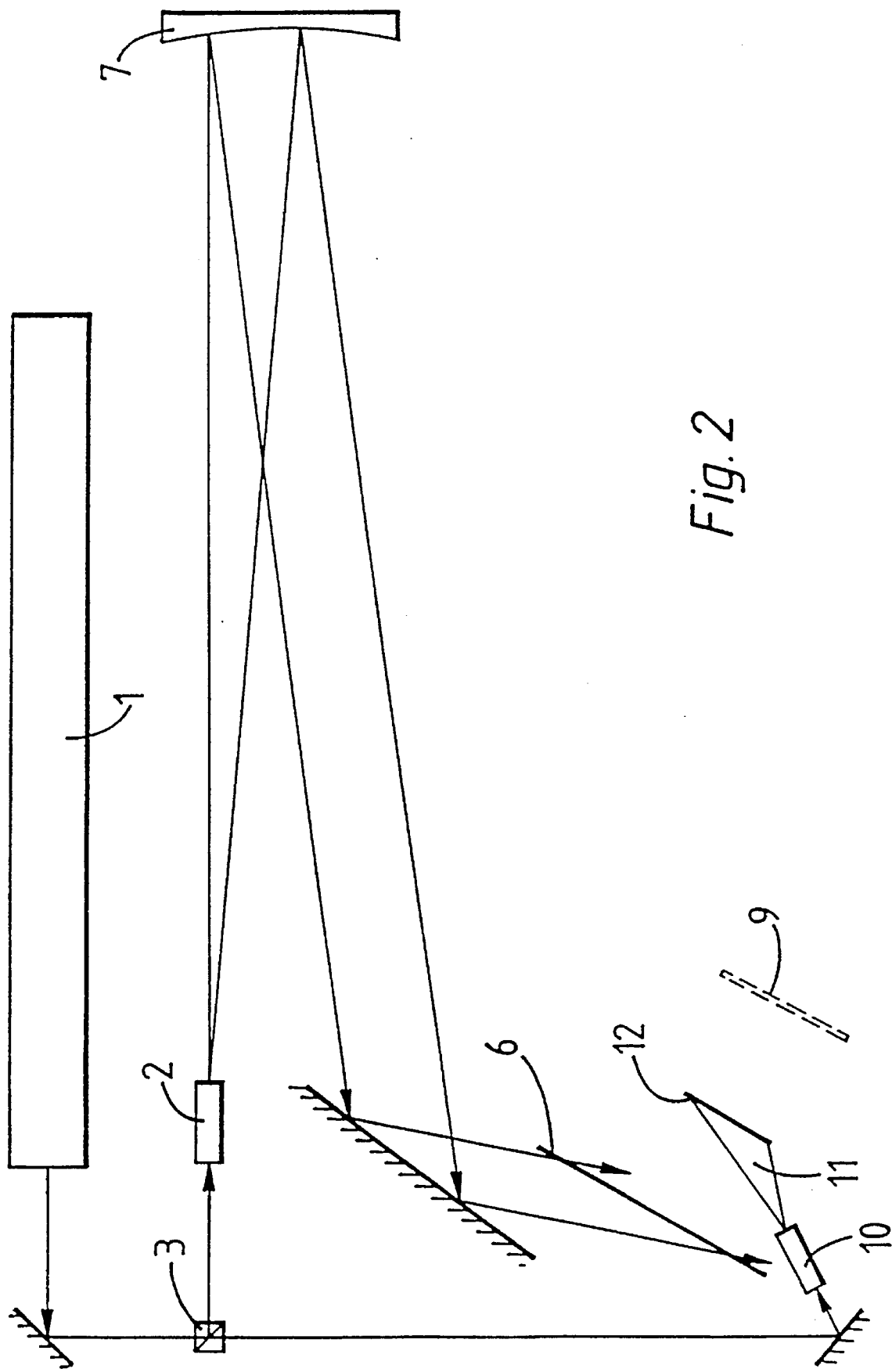
FIG. 2 is a diagrammatic perspective view of another method of recording a diffusing HOE for apparatus in accordance with the present invention.

In the arrangement shown in FIG. 2 of the drawings the laser 1, the beam splitter 3 and the beam expanders 2 and 4 are provided as in the apparatus shown in FIG. 1 but the collinated beam 8 now becomes a restructuring beam. The master 6 is reversed before being replaced in the beam, this means that the beam is the conjugate of the original reference beam and a real image 9 of the diffuser is formed. A second (unexposed) holographic plate 12 is placed between the plate 6 and an image 9. The plate 12 is provided with a reference beam 11 spreading from a beam expander 10 placed close to the plate 12. The light from the reference beam 11 and the light forming the image of the diffuser interfere and the resulting pattern is recorded by the plate 12 and the HOE is thereby formed.

The plate 12 may be provided as a component in the screen or as a tool for use in the manufacture of additional similar HOEs.

As an alternative to manufacturing such HOEs it is possible to replicate them optically by contact copying. In either process the holographic material should exhibit a good diffraction efficiency and a good signal to noise ratio. Examples of material embodying such characteristics are photopolymer and dichromated gelatine (D.C.G.) Alternatively, the HOE may be reproduced as a surface relief pattern which might be embossed or moulded in clear plastic.

Figure 3:
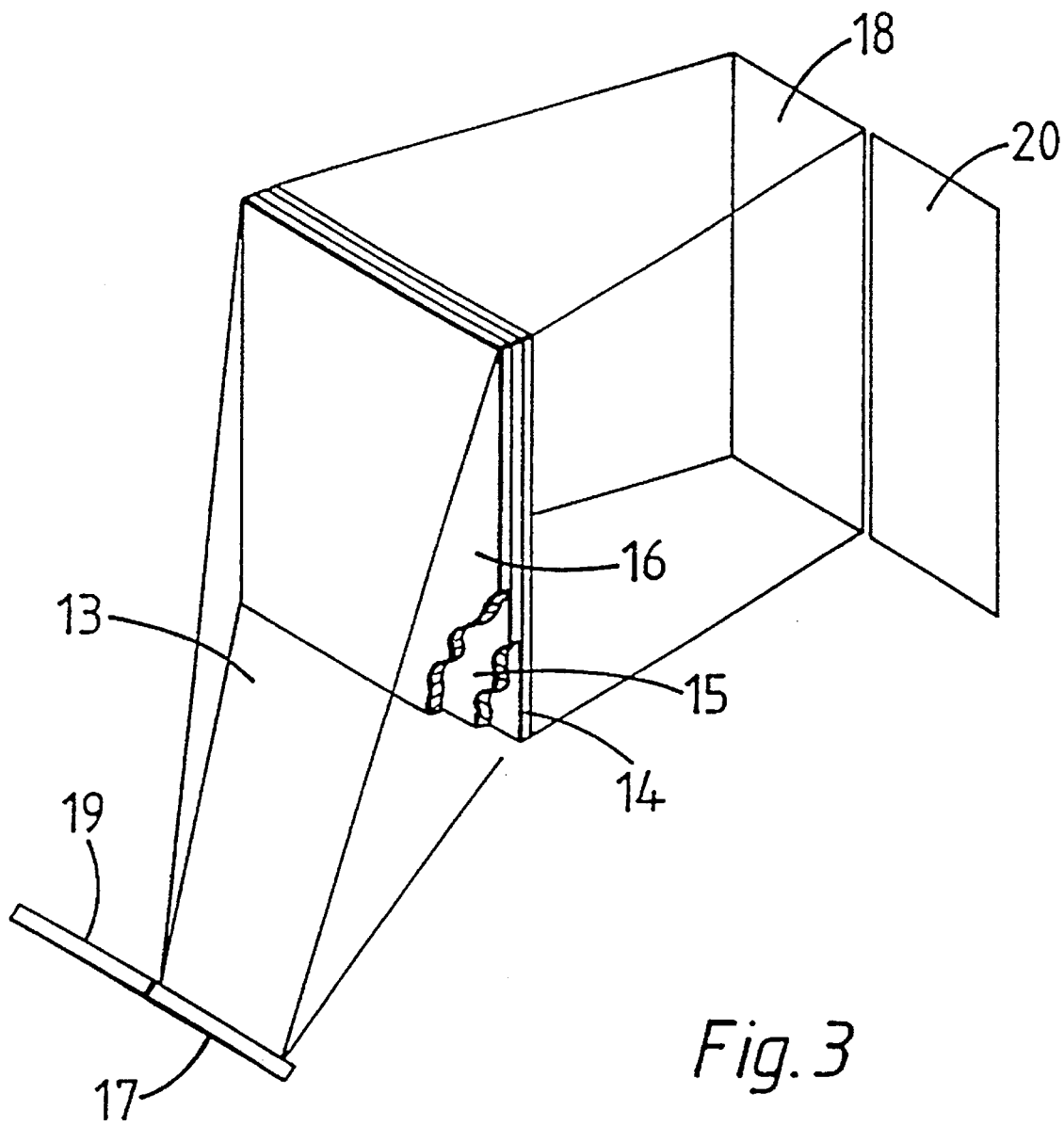
FIG. 3 is a diagrammatic perspective view of an embodiment of apparatus in accordance with the present invention.

Referring now to FIG. 3 of the drawings, there is shown a diagrammatic perspective view of an embodiment of viewing apparatus in accordance with the invention. A HOE 15 is made using a narrow vertical strip diffuser. The HOE 15 is located between a liquid crystal display (LCD) 14 and a louvred screen 16 and the HOE 15 is illuminated from the side thereof adjacent the screen 16 by a beam 13 from a horizontal strip lamp 17. A second horizontal strip lamp 19 is provided adjacent the lamp 17.

The HOE 15 is made using a narrow vertical strip diffuser. A real image of this diffuser is formed and spread sideways at 18 when the HOE 15 is illuminated by the strip lamp 17. When the strip lamp 19 is activated, a real image is formed at 20.

The louvred screen 16 is adapted to receive light at a predetermined angle of incidence, for example 55°, but is opaque when viewed at other angles. It prevents a viewer from looking through the screen while permitting light from the lamps 17, 19 to pass through it and strike the HOE 15 at a correct angle. It thereby improves contrast.

When the lamp 17 is operative, light from the lamp passes through the louvred screen 16, is diffracted by the HOE 15, passes through the LCD 14 and then forms a spread real image of the diffuser at 18.

If the screen is viewed from a position around the image 18 or, more specifically, if the eye is positioned such that all straight lines drawn through the observer's eye and points on the screen also pass through the real image 18, the whole screen will be seen to be illuminated and whatever image there is on the LCD 14 will be visible. If the screen is viewed from around the zone 20 the screen will be dark and the image invisible. Conversely, if the lamp 19 is operative and the lamp 17 is inoperative the LCD image will be visible from the zone 20 but not from the zone 18.

If there are two alternating images on the LCD 14 and the two lamps 17 and 19 are operational alternately in synchronism with the alternating images, one image will be visible from zone 20 and the other from zone 18. If the two images are a stereo pair and if the viewer is positioned such that one eye is in zone 18 and the other eye is in zone 10 the image will be seen in stereoscopic 3-D.

It will be appreciated that the number of viewing zones need not be limited to two—for example the number of views may be increased, alternatively the views could be repeated to each side allowing more than one person at a time to see a stereo pair.

It will be appreciated that the diffusers need not be narrow strips but may also be wide.

It will be appreciated that the diffusers do not need to be parallel to the HOE but may be inclined to it.

It will be appreciated that the lamps may have any spectral characteristics, for example white or monochromatic.

It will be appreciated that the illumination may be direct, or make use of diffraction gratings, lenses, prisms, mirrors or other optical devices to direct the light towards the HOE.

It will be appreciated that additional optics may be incorporated to effect dispersion compensation.

It will be appreciated that the light sources need not be located below the screen but may be in a variety of other positions, according to how the HOE is made and the effect of additional optical elements incorporated in the apparatus.

It will be appreciated that the strip lamps may be replaced by groups of lamps. For example each strip lamp may be replaced with a group of lamps comprising one of each primary colour.

It will be appreciated that the strip lamps may be replaced with individual or grouped smaller sources for example point LEDs.

It will be appreciated that the HOE may be made using a plurality of diffusers and that this will give rise to there being a plurality of similar viewing zones.

It will also be appreciated that the screen may be used for showing several sets of information and not necessarily in 3-D. For example, the two images which are viewed at the zones 18,20 could be a standard stereo pair either as a photographic 'still or as a moving film. In another example, two sets of information can be shown at the respective viewing zones 18,20 and this would double the effective screen area since a viewer would only have to move his or her head to switch from one image to another.

Nevertheless, there are many advantgages for the 3-D application, for example in the field of computer aided design and stereo presentation of computer VDU outputs and arcade and personal computer games. It should also be possible to combine two discreet sets of information with a stereo image.

Figure 4:
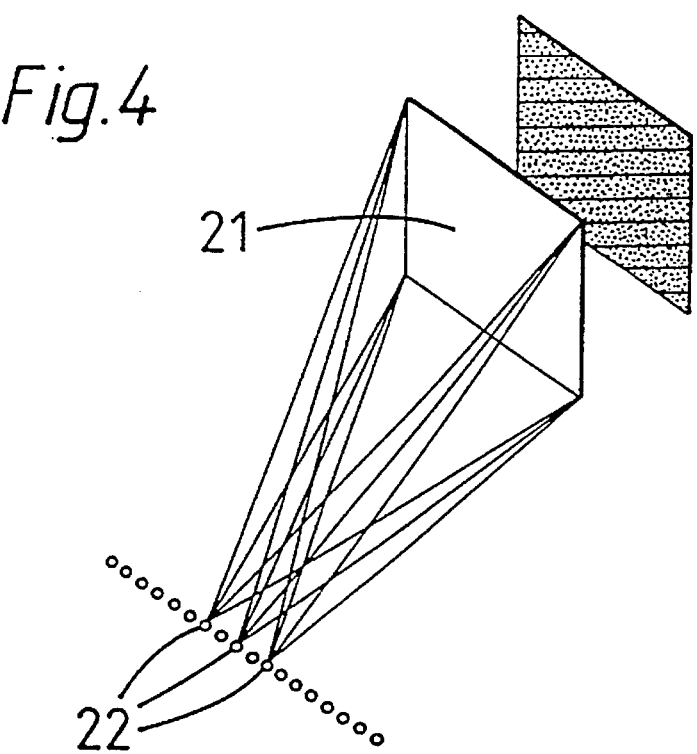
FIG. 4 is a diagrammatic representation of another embodiment of apparatus in accordance with the present invention.
Figure 5:
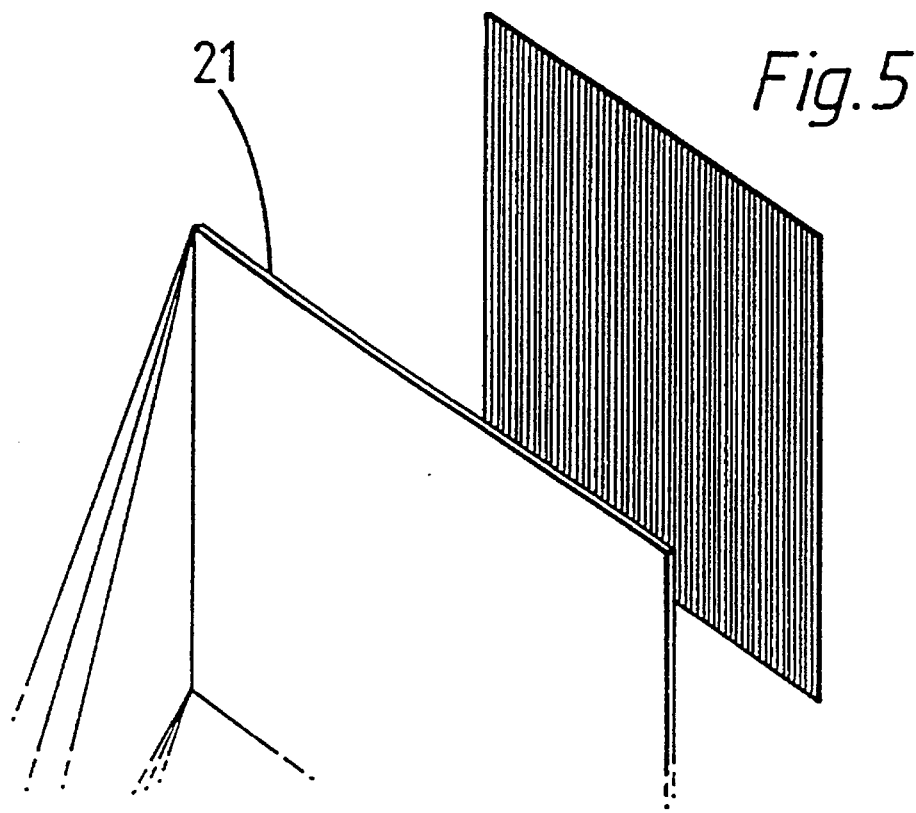
FIG. 5 is an enlarged view of a portion of the apparatus shown in FIG. 3.

Referring now to FIGS. 4 and 5 of the drawings, there is shown apparatus comprising a holographic screen 21 and a plurality of lamps 22 spaced one from another each for illuminating the screen 21. The screen 21 is of similar construction to the combination of the components 14, 15 and 16 in the previous example which, when illuminated by any one of the lamps 22 projects from the screen 20 a real image of a vertical diffuser. The beam of light from each of the lamps 22 is spatially modulated in such a way as to cast an image on the screen 21.

The lamps 22 are arranged to switch on and off sequentially, the effect being that the real image of the diffuser is seen to move horizontally. The speed of operation of the lamps 22 is sufficient for persistence of vision. If the images that are produced correspond to different angles of view of a 3-D object, whether real or artificially generated, and it is arranged that each eye of the viewer sees different views of the object corresponding to the correct stereo pair, the object will be viewed in 3-D.

The number of views may be three or more. If there are many such views (say approximately 100) then there will be sufficient viewing angle and the slits can be narrow enough (say 2 mm wide) for there to be the sensation of continuous paralax giving the possibility of looking around the image.

We claim:

1. Viewing apparatus comprising a holographic recording of a diffusely illuminated zone and means for illuminating the holographic recording from a plurality of different positions such that images of the zone are reconstructed forming viewing zones characterised in that there is provided adjacent the holographic recording a modulating screen for effecting spatial modulation of light from the respective positions, the arrangement being such as to provide a plurality of viewing zones whereby the said spatial modulation can be seen from a corresponding one of the zones.

2. Apparatus as claimed in claim 1 characterised in that light emanates from the different positions sequentially so as to illuminate sequentially respective images on said screen.

3. Apparatus as claimed in claim 2 characterised in that images are arranged in stereo pairs and the sequential illumination is of a speed such as to provide persistence of vision.

4. Apparatus as claimed in claim 3 characterised in that said modulating screen having means responsive to electrical signals for controlling transmission of light therethrough.

* * * * *